United States Patent [19]

Zanier et al.

[11] Patent Number: 5,072,524
[45] Date of Patent: Dec. 17, 1991

[54] ELECTRONIC SENSOR FOR THE MEASUREMENT OF LINEAR MAGNITUDES

[75] Inventors: Adriano Zanier, Prilly; Jürg Lendi, Lausanne, both of Switzerland

[73] Assignee: Tesa S.A., Switzerland

[21] Appl. No.: 554,134

[22] Filed: Jul. 17, 1990

[30] Foreign Application Priority Data

Sep. 1, 1989 [CH] Switzerland ............... 3176/89

[51] Int. Cl.$^5$ ............... G01B 7/02; G01B 5/02
[52] U.S. Cl. ............... 33/558; 33/561; 33/501.6
[58] Field of Search ............... 33/501.6, 561, 556, 33/559, DIG. 5

[56] References Cited

U.S. PATENT DOCUMENTS 3,670,420 6/1972 Kiewicz ............... 33/561
4,543,732 10/1985 Maples ............... 33/558 X Primary Examiner—Harry N. Haroian
Attorney, Agent, or Firm—Anthony J. Casella; Gerald E. Hespos

[57] ABSTRACT

The sensor is of the type having a cylindrical body within which a measurement rod equipped with an outer measurement feeler bears a ferrite core which by its displacements influences the impedance of a system of coils to produce an electrical measurement signal. In the body, a fixed stop and an interposed movable stop make it possible to adjust the positioning of the measurement feeler in one or the other of two positions with respect to the electrical zero of the feeler and they have for this purpose interpenetration means with two stages spaced at an angle from each other and selected by manual push and rotation of the rod driving the movable stop in opposition to a spring and then release, in the manner of the so called "bayonet" connections.

5 Claims, 2 Drawing Sheets

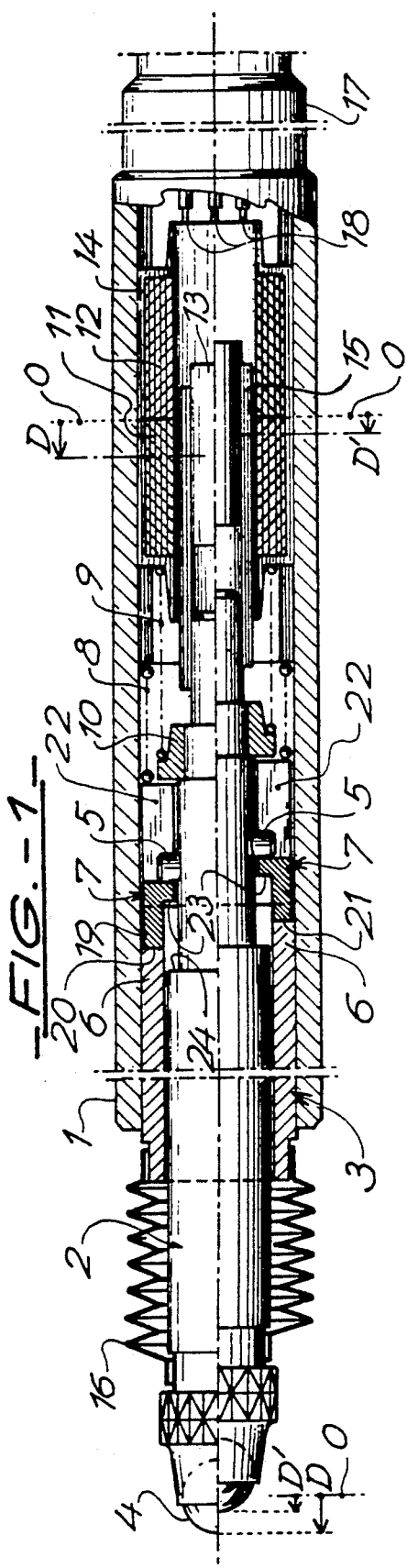
FIG.-1-
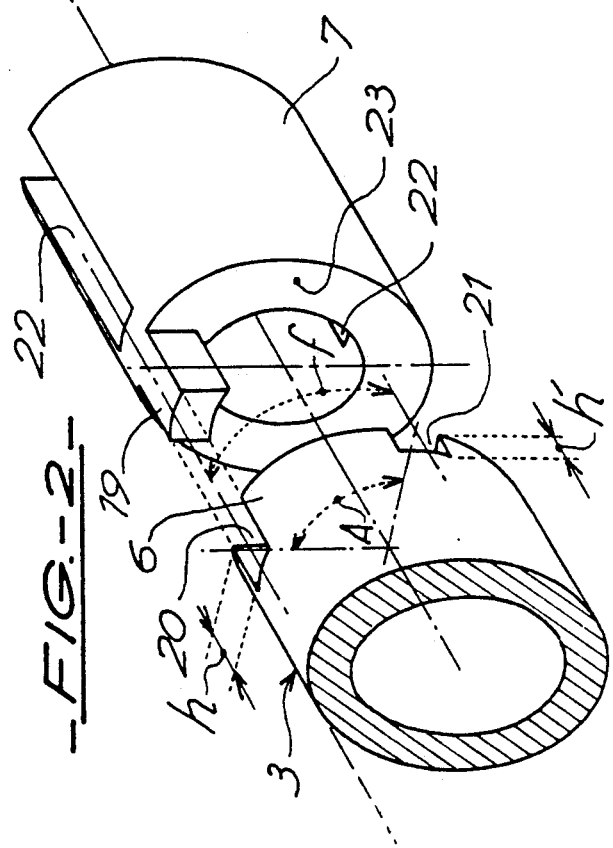
FIG.-2-

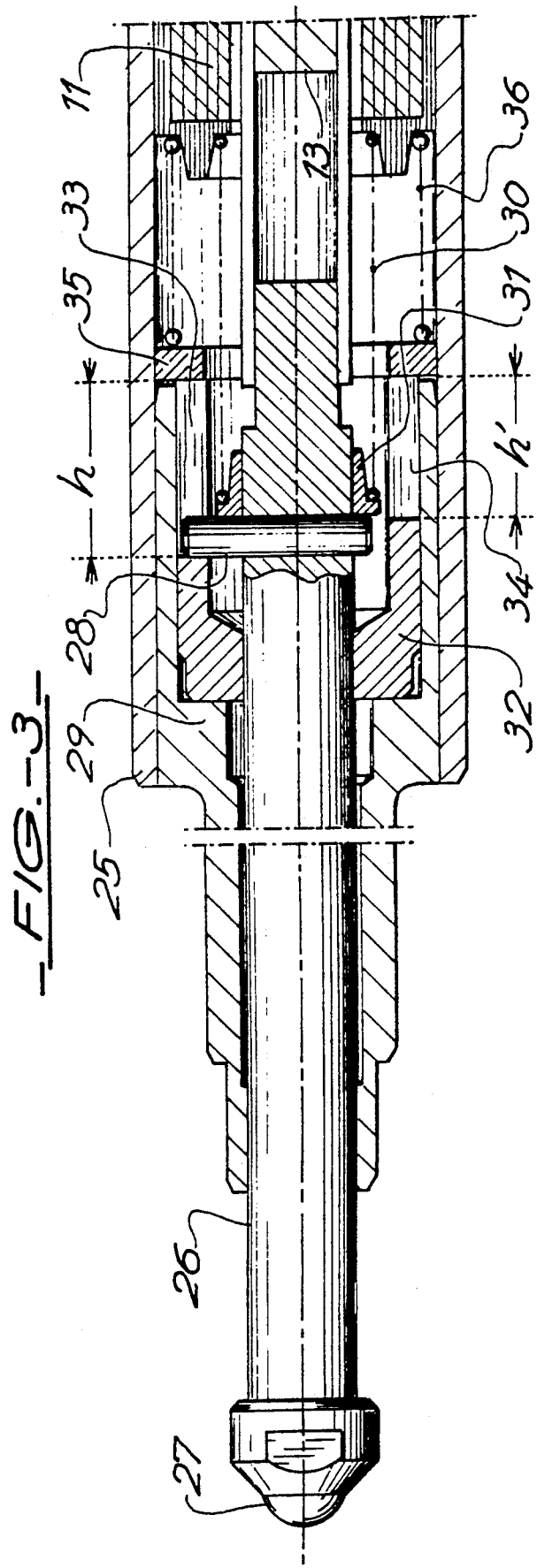

ELECTRONIC SENSOR FOR THE MEASUREMENT OF LINEAR MAGNITUDES

The present invention has as its object an electronic sensor for measurement of linear magnitudes used, in particular, for dimensional verification of the geometrical conformations of mechanical parts in a manufacturing shop.

This sensor is of a type having a body intended to be fastened in a measurement support, a measurement rod movable axially within the body in the direction of the measurement over a distance limited by an adjustable system of end-of-stroke stops, comprising a resting piece integral with the rod, an end-of-stroke stop which is associated with the body which is intended to limit the measurement stroke and a spring between the rod and the body to produce a measurement pressure, a measurement feeler fastened to the end of the rod on the outside of the body, an electronic transducer in the body sensitive to the axial displacements of the rod and adapted to produce an electric signal representing the algebraic magnitude of the said displacements with respect to a preestablished electrical zero, and means for adjusting the position of the measurement feeler with respect to the electrical zero.

In known sensors of this type, the adjustment of the position of the measurement feeler with respect to the electrical zero is obtained by displacement of at least one stop of the system of stops for the adjustment of the measurement stroke by screwing or unscrewing at least one element of this system in the body by means of a suitable tool.

The checking of the selected positioning of the measurement feeler with respect to the electrical zero is effected by reading its value on an electronic analog or digital measurement indicator apparatus connected to the output of the electronic transducer of the feeler, or else possibly by manual repetition of the number of screwing or unscrewing revolutions of the element displaced, memorized by the operator, this latter method of operation being, however, difficult to control.

This process of regulating the position of the measurement feeler with respect to the electrical zero is slow due to the screwing or unscrewing operation which it implies, and is difficult due to the necessity of the position control obtained either by reading its value or by memorization of the operator.

The object of the invention is to make the process of adjusting the position of the measurement feeler of the sensor with respect to the electrical zero faster and simpler by means or simpler structures which are less expensive and take up less space.

For this purpose, the sensor of the invention is characterized by the fact that the body and the measurement rod have local interpenetration means which have at least one resting stage of predetermined height in the direction of displacement of the rod and are arranged between the resting piece of the rod and the stop associated with the body, and a spring for maintaining these means in resting application, the interpenetration in the resting stage being localized by manual push in opposition to the spring and rotation of the rod around its longitudinal axis, and then obtained and assured by release, in the manner of so-called "bayonet" connections.

In this way, the adjustment of the selected positioning of the measurement feeler with respect to the electrical zero is obtained by the interpenetration of the means provided for this purpose, this positioning being defined by the height of the resting stage, and this in fast and simple manner by manipulation of the rod by the measurement feeler, without requiring screwing by means of a suitable tool and without requiring checking of the value of the difference between the position obtained and the electrical zero.

The number of resting stages defining this position of the measuring feeler with respect to the electrical zero may be greater than one and may be selected on each occasion as a function of variables such as the shape of the part to be checked, the shape of the measurement feeler as well as the magnitude of the tolerances of the dimensions to be checked, as, for instance, for the checking of series of different parts by means of one and the same sensor, each resting stage being adapted to a range of these values.

It is possible to define a resting stage corresponding to a short engagement stroke of the measurement feeler with the part to be checked, for instance in order to avoid any risk of breakage in the case of a sliding engagement, laterally with respect to the axial displacement of the rod of the sensor, when the operator does not wish to use a sensor lifting system before engaging the part to be measured in this manner.

In a first embodiment in accordance with this basic concept, the sensor comprises a mobile interposed stop arranged between the resting piece of the measurement rod and the end-of-stroke stop associated with the body and a spring to push said interposed stop against the end-of-stroke stop, the two stops having interpenetration means formed of a protruding finger on the face of one of them and a corresponding notch on the opposing face of the other, of selected height.

In a second embodiment of even simpler structures, the sensor has an interposed stop fastened to the body between the resting piece of the rod and the end-of-stroke stop associated with the body, interpenetration means formed by a notch on the interposed stop, of selected height, in which the resting piece of the measurement rod is intended to slide and a washer pressed against the interposed stop by a spring and intended elastically to oppose the release of the resting piece of a measurement rod from the notch of the interposed stop, the resting piece of the measurement rod being furthermore pressed against the interposed stop by the spring intended to produce the measurement pressure.

In these two embodiments, when two or more positions of the measurement feeler with respect to the electrical zero of the sensor are desired, a corresponding number of notches of different heights can be provided, these notches being spaced angularly on the elements which have them.

The accompanying drawing shows, by way of example, two embodiments of the object of the invention.

FIG. 1 is an overall view and two axial half sections corresponding to two different positions of the mobile elements of the first embodiment.

FIG. 2 is a perspective view of a detail of FIG. 1.

FIG. 3 is a partial overall view in axial section of the second embodiment.

The sensor shown in FIGS. 1 and 2 in its first embodiment is of the cylindrical type with coaxial elements, the body 1 of which is intended to be fastened in a measurement support, not shown, used in customary manner for the dimensional verification of mechanical parts and which makes it possible to contact it with a part to be measured and move it away as desired, such as for instance, a pneumatic support.

This sensor comprises:

a measurement rod 2 which is movable axially in the body 1 in the direction of the measurement, a guide bearing 3 for the displacements of the measurement rod 2, rigidly connected to the body 1, a measurement feeler 4 fastened to the end of the measurement rod 2 on the outside of the body 1, an adjustable system of end-of-stroke stops for the displacements of the measurement rod 2 in the body 1, comprising a resting piece 5 integral with said rod and formed here by a traversing pin, also constituting an antirotation guide, an end-of-stroke stop associated with the body 1 and formed here by the inner end 6 of the bearing 3, a mobile interposed stop 7 arranged between the resting piece 5 and the stop 6, and a push spring 8 for pushing said interposed stop 7 against the end-of-stroke stop 6; the interposed stop 7 and the stop 6 are shown in detail in FIG. 2 and described below, a spring 9 between the measurement rod 2 and the body 1, resting here against the rod 2 via a sleeve 10, in order to produce a measurement pressure of the feeler 4 against the parts to be measured, an electronic measurement transducer 11-12-13 in the body 1, sensitive to the axial displacements of the measurement rod 2 and adapted to produce an electrical signal representative of the algebraic magnitude of said displacements with respect to a preadjusted zero (0). This transducer is in this case, for instance, of the inductive type comprising two coils 11 and 12 held in an insulating support 14 fastened in the body 1 and a ferrite core 13 which is held in an insulating tube 15 fastened to the end of the measurement rod 2 opposite the measurement feeler 4 and in which the ferrite core 13 influences the impedance of the coils 11 and 12 by its changes of position in order to produce the electrical measurement signal, a protection bellows 16 to protect the rod 2 against external agents, between the measurement feeler 4 and the body 1, and a flexible connecting sleeve 17, shown in part, by which the electrical output conductors 18 of the electronic transducer are connected to a cable intended to connect them to an indicating apparatus of the customary type tuned to the transducer.

In this overall structure, the interposed stop 7 and the inner end 6 of the guide bearing 3 for the measurement rod 2, which are shown in detail in FIG. 2, are cylindrical elements comprising local interpenetration means with two resting stages of different heights h and h' in the direction of the axial displacement of the measurement rod 2, and which are formed here by:

a resting finger 19 protruding from the face of the interposed stop 7 located opposite the end 6 of the bearing 3, a first notch 20 of height h in the end 6 of the wall of the bearing 3, intended to be penetrated by the finger 19, and a second notch 21 of smaller height h' that the height h of the first notch 20, which is located at an angular distance A from the latter, for instance 90°, and is also intended to be penetrated by the resting finger 19.

The interposed stop 7 has in its cylindrical wall behind the finger 19 two longitudinal slots 22 debouching on its face opposite said finger, 180° from each other, along which the pin 5 (FIG. 1) for the anti-rotation guidance of the measurement rod 2 can freely move and which are intended to permit the driving in rotation of said interposed stop by said measurement rod 2, over their entire lenght.

The movable interposed stop 7 has a drive face 23 located opposite a shoulder 24 of the measurement rod 2, the distance between these two elements being at most equal to the free stroke of the pin 5 which is rigidly secured to the measurement rod 2 along the slots 22; this distance corresponding to the measurement stroke along which the measurement feeler 4 is subject solely to the measurement pressure of the spring 9, via the sleeve 10.

At the end of this measurement stroke, when the measurement rod 2 is pushed axially in the direction of the body 1 by grasping of the measurement feeler 4, the shoulder 24 encounters the drive face 23 of the interposed stop 7 and the latter, if one continues pushing, frees its finger 19 from the notch 20 or 21 in which it is engaged, in opposition to the push spring 8. At this time, by driving of the pin 5 engaged in the slote 22 of the interposed stop 7, the latter can be turned, in accordance with the arrow f of FIG. 2, around its longitudinal axis until its finger 19 locates the other notch 20 or 21 and penetrates into it under the push of the spring 8, after relaxation of the measurement rod 2.

The tactile sensitivity alone of the operator is sufficient for this positioning, and the operation of the release of the measurement feeler in a position of withdrawal by the means described is rapid and simple, which is duly in accord with the object of the invention.

Of course, the heights h and h' of the localized stage interpenetration system of the interposed stop 7 and of the end 6 of the bearing 3 are determined as a function of the desired positions of retraction D and D' in front of the preadjusted zero (0) of the measurement transducer, as indicated in FIG. 1.

The sensor shown in FIG. 3 in its second embodiment is also of the cylindrical type with coaxial elements the body 25 of which is intended to be fastened in a measurement support such as, for instance, a pneumatic support.

This sensor comprises, arranged substantially in the same manner as in the first embodiment, the following elements:

a measurement rod 26 equipped with a measurement feeler 27, a resting piece integral with the measurement rod 26 formed by a traversing pin 28, an end-of-stroke stop 29 forming here part of the structure of the body 25, a spring 30 between the measurement rod 26 and the body 25, resting here also against the rod via a sleeve 31, to produce the measurement pressure, with the difference, however, that here this sleeve rests directly against the pin 28;

an electronic measurement transducer comprising the same components with the same functions as those of the transducer of the first embodiment and of which there are visible here only a coil 11 associated with the body 25 and the ferrite core 13 associated with the measurement rod 26.

The means of adjustment of the position of the measurement feeler with respect to the electric zero of the electronic transducer are formed here by:

an interposed stop 32 fastened to the body 25 between the resting piece 28 of the measurement rod 26 and the end-of-stroke stop 29 associated with the body 25, two notches 33 and 34 of different respective, heights h and h' in the cylindrical wall of the interposed stop 32, extending in the direction of the displacements of the measurement rod 26 and spaced angularly apart by 180°; these notches 33 and 34 being intended for the sliding and axial guiding of the pin 28 associated with the measurement rod 26, a washer 35 pressed against the interposed stop 32 at the end of the two notches 33 and 34 by a second spring 36 and intended elastically to oppose the release of the resting part 28 of the measurement rod 26 from these notches.

In this particularly simple structure, the spring 30 supplying the measurement pressure also serves to maintain the resting piece 28 of the measurement rod 26 pressed against the bottom of one or the other of the two notches 33 and 34 of the interposed stop 32.

In this second embodiment, when the operator axially pushes the measurement rod 26 in the direction of the body 25 against the spring 30 by grasping the measurement feeler 27, the resting piece formed by the pin 28 slides first of all along the notch in which it is engaged, in this case the notch 33 of height h, until striking against the washer 35.

When the operator continues to push, the washer 35 yields elastically in opposition to the second spring 36 and the pin 28 emerges from the notch 33 in which it was engaged. At this time, this pin 28 can be turned by rotation of the measurement rod 26 up to the location of the other notch 34 and introduced into the latter under the combined push of the two spring 30 and 36, after release of the measurement rod 26, and finally pushed by the single spring 30 up to the end of said notch 34 of height h' different from that of the other notch 33.

The positioning effects are the same here as in the first embodiment but obtained, however, by simpler means.

The principle of the positioning of the measurement feeler with respect to the electrical zero of the sensor is obviously applicable to all types of sensors with axially movable measurement rod.

Variants are applicable with respect to the number of positions selected of the measurement feeler with respect to the electrical zero and the effects of the invention are obtained upon the selection of a single one of them.

The means of interpenetration of the first embodiment can be reversed by placing, for instance, the finger 19 at the end of the end 6 of the bearing 3 and the notch or notches 20-21 in the interposed stop 7.

Likewise a single notch 22 is sufficient in this first embodiment for axially guiding the pin 5 of the measurement rod 2, in which case this pin will protrude on only a single side.

We claim:

1. An electronic measurement sensor for linear magnitudes, comprising a body intended to be fastened in a measurement support, a measurement rod movable axially within the body in the direction of the measurement over a distance limited by an adjustable system of end-of-stroke stops, comprising a resting piece integral with the rod, an end-of-stroke stop associated with the body and intended to limit the measurement stroke, and a spring between the rod and the body to produce a measurement pressure, a measurement feeler fastened on the tip of the rod on the outside of the body, an electronic transducer within the body sensitive to axial displacements of the rod and adapted to produce an electric signal representative of the algebraic magnitude of said displacements with respect to a preadjusted electric zero, and means for adjusting the positioning of the measurement feeler with respect to the electric zero, characterized by the fact that the body (1, 25) and the measurement rod (2, 26) comprise local interpenetration means (19-20-21, 28-33-34) having at least one resting stage of predetermined height in the direction of displacement of the rod, which means are located between the resting piece (5, 28) of the rod and the stop associated with the body, and a spring (8, 30) to keep said means resting against same, the interpenetration in the resting stage being located by manual push in opposition to the spring and rotation of the rod around its longitudinal axis, and then obtained and assured by release, in the manner of so-called "bayonet" connections.

2. A sensor according to claim 1, characterized by the fact that it comprises a movable interposed stop (7) arranged between the resting piece (5) of the measurement rod (2) and the end-of-stroke stop (6) associated with the body (1), and a spring (8) to push said interposed stop against the end-of-stroke stop, and by the fact that these two stops (7, 6) have interpenetration means formed of a finger (19) protruding from a face of one of them (7) and a corresponding notch (20, 21) of a selected height (h, h') on the opposing face of the other.

3. A sensor according to claim 1, characterized by the fact that it comprises a movable interposed stop (7) arranged between the resting piece (5) of the measurement rod (2) and the end-of-stroke stop (6) associated with the body (1), and a spring (8) to push said interposed stop against the end-of-stroke stop, and by the fact that these two stops (7, 6) have interpenetration means formed of a finger (19) protruding from a face of one of them (7) and at least two corresponding notches (20, 21) on the opposing face of the other (6), these two notches being of different heights (h, h') and being spaced angularly apart by a selected angle.

4. A sensor according to claim 1, characterized by the fact that it comprises an interposed stop (32) fastened to the body (25) between the resting piece (28) of the rod (26) and the end-of-stroke stop (29) associated with the body, interpenetration means formed of a notch (33; 34) in the interposed stop, of selected height (h; h'), in which the resting piece (28) of the measurement rod is intended to slide, and a washer (35) pressed against the interposed stop by a spring (36) and intended elastically to oppose the release of the resting piece of the measurement rod from the notch of the interposed stop, the resting piece of the measurement rod being furthermore pressed against the interposed stop by the spring (30) intended to produce the measurement pressure.

5. A sensor according to claim 1, characterized by the fact that it comprises an interposed stop (32) fastened to the body (25) between the resting piece (28) of the rod (26) and the end-of-stroke stop (29) associated with the body, interpenetration means formed of at least two notches (33, 34) in the interposed stop, of different heights (h, h'), spaced angularly from each other by a selected angle and in one or the other of which the resting piece (28) of the measurement rod is intended to slide, and a washer (35) pressed against the interposed stop by a spring (36) and intended elastically to oppose the release of the resting piece (28) of the measurement rod from the notches (33, 34) of the interposed stop, the resting piece of the measurement rod being furthermore pressed against the interposed stop by the spring (30) intended to produce the measurement pressure.

* * * * *